(12) United States Patent
Janicki

(10) Patent No.: US 9,599,459 B1
(45) Date of Patent: Mar. 21, 2017

(54) CONVEYOR BELT, CONVEYOR BELT ASSEMBLY INCLUDING AN IMAGING SYSTEM, AND METHODS OF USING THE SAME

(71) Applicant: United Parcel Service of America, Inc., Atlanta, GA (US)

(72) Inventor: Piotr Janicki, Brussels (BE)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 15/052,319

(22) Filed: Feb. 24, 2016

(51) Int. Cl.

| | | |
|---|---|---|
| *G01B 11/14* | (2006.01) | |
| *B07C 3/14* | (2006.01) | |
| *B65G 15/30* | (2006.01) | |
| *B07C 5/10* | (2006.01) | |
| *G01B 11/02* | (2006.01) | |
| *G06T 7/60* | (2006.01) | |
| *H04N 7/18* | (2006.01) | |
| *G06T 7/00* | (2006.01) | |

(Continued)

(52) U.S. Cl.
CPC ............... *G01B 11/14* (2013.01); *B07C 3/14* (2013.01); *B07C 5/10* (2013.01); *B65G 15/30* (2013.01); *B65G 43/08* (2013.01); *G01B 11/02* (2013.01); *G06K 9/78* (2013.01); *G06T 7/004* (2013.01); *G06T 7/0004* (2013.01); *G06T 7/602* (2013.01); *G06T 7/70* (2017.01); *H04N 7/181* (2013.01); *B65G 2203/041* (2013.01); *G06T 2207/10016* (2013.01)

(58) Field of Classification Search
CPC ... G06K 9/74; G06K 9/78; B07C 3/14; G01B 11/14
See application file for complete search history.

(56) References Cited

U.S. PATENT DOCUMENTS

| | | |
|---|---|---|
| 3,685,012 A | 8/1972 | Case et al. |
| 4,254,433 A | 3/1981 | Dewar, Jr. et al. |

(Continued)

OTHER PUBLICATIONS

Mathworks, "Measuring Planar Objects with a Calibrated Camera", retrieved from <http://www.mathworks.com/help/vision/examples/measuring-planar-objects-with-a-calibrated-camera.html?requestedDomain=www.mathworks.com>on Feb. 24, 2016, 10 pages.

(Continued)

*Primary Examiner* — Thomas Randazzo
(74) *Attorney, Agent, or Firm* — Alston & Bird LLP

(57) ABSTRACT

Various embodiments provide an improved conveyor belt comprising: a visible surface having a primary axis oriented in a machine direction; a plurality of first stripes having a first visible appearance, each of the plurality of first stripes at least in part defining the visible surface and being oriented perpendicular to the primary axis; and a plurality of second stripes having a second visible appearance, each of the plurality of second stripes at least in part defining the visible surface and being oriented perpendicular to the primary axis, wherein: the second visible appearance provides a contrasting appearance relative to the first visible appearance; and each of the plurality of second stripes are located intermediate two of the plurality of first stripes such that the plurality of first and second stripes collectively define an alternating contrasting pattern on the visible surface of the improved conveyor belt.

25 Claims, 8 Drawing Sheets

(51) Int. Cl.
*G06K 9/78* (2006.01)
*B65G 43/08* (2006.01)

(56) References Cited

U.S. PATENT DOCUMENTS

| | | | | |
|---|---|---|---|---|
| 5,065,237 | A * | 11/1991 | Tsikos | B07C 1/02 |
| | | | | 209/586 |
| 6,246,642 | B1 * | 6/2001 | Gardner, Jr. | G11B 15/682 |
| | | | | 369/30.42 |
| 7,184,585 | B2 * | 2/2007 | Hamza | G06K 9/00771 |
| | | | | 348/135 |
| 7,810,536 | B2 * | 10/2010 | Bassi | B65B 35/56 |
| | | | | 156/350 |
| 8,401,146 | B2 * | 3/2013 | Vorhees | G01N 21/8901 |
| | | | | 378/57 |
| 8,815,031 | B2 | 8/2014 | Olsen et al. | |
| 9,367,770 | B2 * | 6/2016 | Footen | G06K 9/78 |
| 2004/0026300 | A1 | 2/2004 | Kibbler et al. | |
| 2010/0080603 | A1 * | 4/2010 | Takahashi | G03G 15/50 |
| | | | | 399/72 |
| 2013/0135689 | A1 * | 5/2013 | Shacham | H04N 1/38 |
| | | | | 358/464 |
| 2014/0036135 | A1 | 2/2014 | Gehring et al. | |
| 2015/0360877 | A1 * | 12/2015 | Shin | B65G 43/08 |
| | | | | 382/103 |

OTHER PUBLICATIONS

International Searching Authority, International Search Report and Written Opinion for International Application No. PCT/US/2016/051617, Dec. 20, 2016, 12 pages, European Patent Office, Netherlands.

* cited by examiner

CONVEYOR BELT, CONVEYOR BELT ASSEMBLY INCLUDING AN IMAGING SYSTEM, AND METHODS OF USING THE SAME

BACKGROUND

Considerable attention has been directed toward automated handling of packages being transported by carriers through transportation networks. Yet automated handling is a complex problem with many parts, such that no single system or method alone appears to provide a comprehensive solution for all conditions. Instead, for accurate and efficient automated handling to occur, it appears as though a combination of many different and many improved techniques and assemblies are required. Thus, simplicity and cost become important considerations.

A primary component in many systems and methods for automated handling of packages is a conveyance device (i.e., conveyor belt), which are generally formed and/or extended around at least two driving wheels. Thus, by turning the driving wheels, the conveyor belt may be run endlessly. Conveyor belts may also generally be flexible and deformable at least while running in contact with the driving wheels, and a multitude of materials, linkages, and so forth have been used to achieve these goals.

Where automated handling of packages has been implemented in connection with conveyor belts and otherwise, certain inefficiencies may arise. For example, where packages may be improperly or too closely placed relative to one another on the conveyor belt, congestion could arise, impacting various measurements or the like that need to be performed on the packages while on the conveyor belt. Still further, where the materials in which packages are wrapped (e.g., foil or paper or the like) differ in color, where the wrapping material is analogous to or matches the color of the conveyor belt, inaccuracies may also arise in any measurements or observations made in an automated fashion relative to the packages.

Thus, a need exists for an improved conveyor belt assembly and associated methods of using and operating the same that facilitate more efficient, effective, and accurate automated handling of packages.

BRIEF SUMMARY

According to various embodiments, there is provided an improved conveyor belt assembly for facilitating improved automated handling of a plurality of packages. The improved conveyor belt assembly comprises a conveyor belt comprising: a visible surface having a primary axis oriented in a machine direction, the visible surface being movable in the machine direction and configured, during movement, to receive thereon each of the plurality of packages; a plurality of first stripes having a first visible appearance, each of the plurality of first stripes at least in part defining the visible surface and being oriented perpendicular to the primary axis; and a plurality of second stripes having a second visible appearance, each of the plurality of second stripes at least in part defining the visible surface and being oriented perpendicular to the primary axis. The second visible appearance provides a contrasting appearance relative to the first visible appearance; and each of the plurality of second stripes are located intermediate two of the plurality of first stripes such that the plurality of first and second stripes collectively define an alternating contrasting pattern on the visible surface of the improved conveyor belt. Also provided is an imaging system comprising a plurality of cameras positioned in a plurality of locations relative to the visible surface of the conveyor belt, the imaging system being configured to provide continuous visibility of each of the plurality of packages received on the visible surface during movement thereof.

According to further various embodiments, a system is provided incorporating the improved conveyor belt assembly described above. The system comprises one or more computer processors configured for: during continuous operation of the improved conveyor belt, capturing, via the imaging system a continuous video sequence containing each of the plurality of packages received on the visible surface during movement thereof; extracting at least one screen shot containing at least one image of at least one of the plurality of packages; and calculating, based at least upon the first and second known widths of the plurality of first and second stripes appearing in the at least one extracted screen shot, one or more dimensions of the at least one of the plurality of packages. The system further comprises one or more memory storage areas configured to associate and store the extracted screen shot and the calculated dimensions with the at least one of the plurality of packages.

According to still further embodiments there is provided a computer-implemented method for facilitating improved automated handling of a plurality of packages. The method comprises the steps of: continuously operating an improved conveyor belt, the improved conveyor belt comprising: a visible surface having a primary axis oriented in a machine direction, the visible surface being movable in the machine direction during the continuous operation and being configured to receive thereon each of the plurality of packages; a plurality of first stripes having a first known width and a first visible appearance, each of the plurality of first stripes at least in part defining the visible surface and being oriented perpendicular to the primary axis; and a plurality of second stripes having a second known width and a second visible appearance, each of the plurality of second stripes at least in part defining the visible surface and being oriented perpendicular to the primary axis, wherein: the second visible appearance provides a contrasting appearance relative to the first visible appearance; and each of the plurality of second stripes are located intermediate two of the plurality of first stripes such that the plurality of first and second stripes collectively define an alternating contrasting pattern on the visible surface of the improved conveyor belt. The method further comprises the steps of: during the continuous operation of the improved conveyor belt, capturing, via an imaging system a continuous video sequence containing each of the plurality of packages received on the visible surface during movement thereof; extracting, via at least one computer processor, at least one screen shot containing at least one image of at least one of the plurality of packages; calculating, via the at least one computer processor and based at least upon the first and second known widths of the plurality of first and second stripes appearing in the at least one extracted screen shot, one or more dimensions of the at least one of the plurality of packages; and associating and storing, in at least one memory storage area, the extracted screen shot and the calculated dimensions with the at least one of the plurality of packages.

Still further various embodiments provide an improved conveyor belt for facilitating improved automated handling of a plurality of packages. The belt in at least these embodiments comprises: a visible surface having a primary axis oriented in a machine direction; a plurality of first stripes having a first visible appearance, each of the plurality of first stripes at least in part defining the visible surface and being oriented perpendicular to the primary axis; and a plurality of second stripes having a second visible appearance, each of the plurality of second stripes at least in part defining the visible surface and being oriented perpendicular to the primary axis, wherein: the second visible appearance provides a contrasting appearance relative to the first visible appearance; and each of the plurality of second stripes are located intermediate two of the plurality of first stripes such that the plurality of first and second stripes collectively define an alternating contrasting pattern on the visible surface of the improved conveyor belt.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Improved Conveyor Belt Assembly 1

Figure 1:
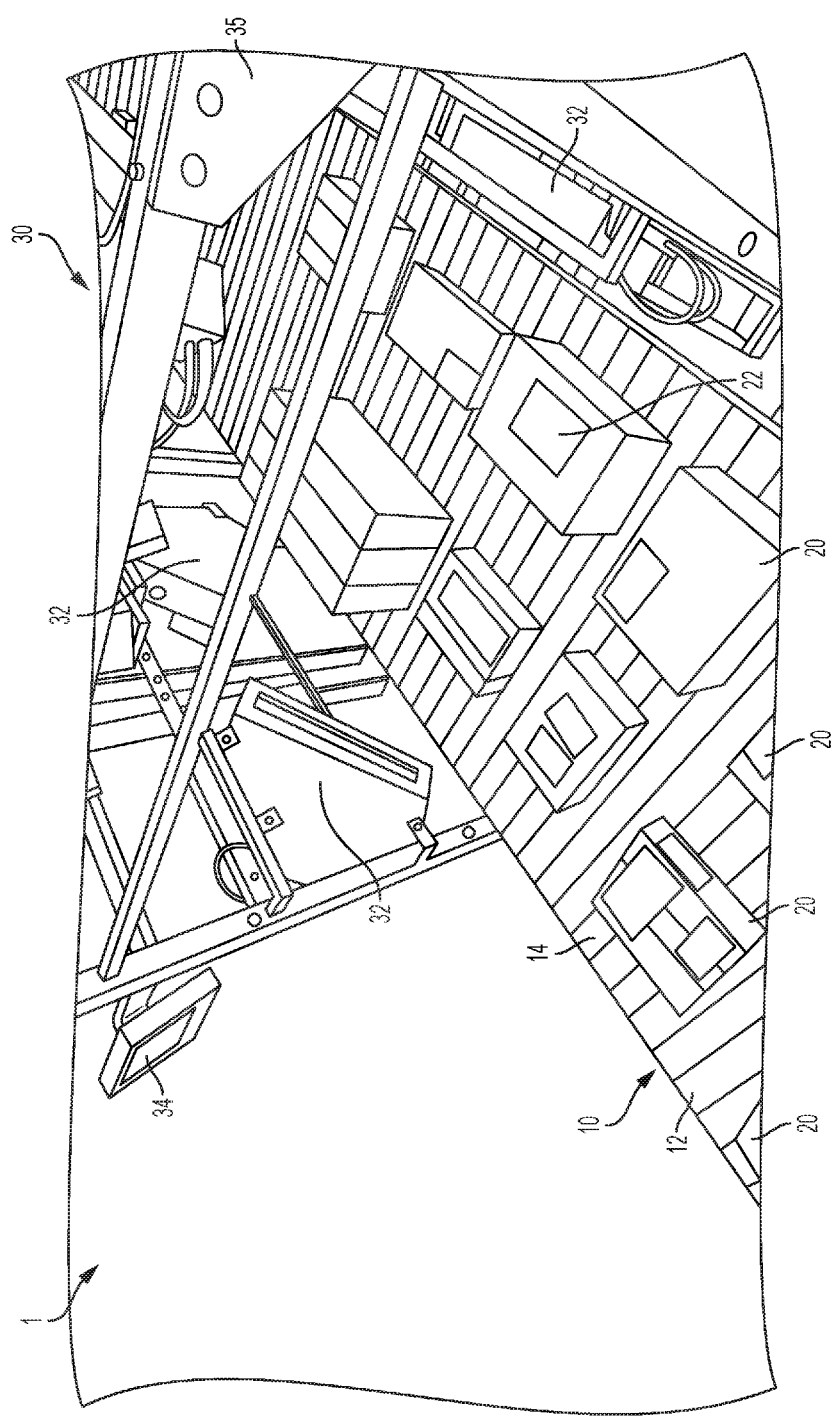
FIG. 1 is a perspective or isometric view of an improved conveyor belt assembly according to various embodiments of the present invention, including an improved conveyor belt and an imaging system associated therewith.

With reference now to FIG. 1, an improved conveyor belt assembly 1 according to various embodiments may be seen therein as comprising an improved conveyor belt 10 and an imaging system 30. The improved conveyor belt assembly 1 is configured according to various embodiment to receive upon the conveyor belt 10 a plurality of packages 20 that are being transported from one location to another, for example, from a package receiving hub to a package departure hub (i.e., a vehicle or truck loading dock) within a package sorting facility or the like.

Generally speaking, according to various embodiments, the improved conveyor belt assembly 1 is configured to facilitate more efficient, effective, and accurate automated handling of packages than that which is obtainable via conventional conveyor belt assemblies and/or conventional conveyor belts. For example, in certain embodiments described in detail further below, the improved conveyor belt assembly 1 enables accurate and efficient determination of whether each of the plurality of packages 20 placed upon the improved conveyor belt 10 are sufficiently spaced relative to one another. When used in conjunction with an associated imaging system 30 in certain embodiments described in detail further below, the improved conveyor belt assembly 1 also enables accurate and efficient calculation of package dimensions and retention of that and other package data for subsequent retrieval. In this manner, as a non-limiting example, the improved conveyor belt assembly 1 may minimize or even eliminate misreads or no-reads of package data, including package labels or other shipping indicia and/or package dimensions. In conventional configurations misreads many times result in consignor or consignee challenges to charges imposed based upon some portion of package data read. In addition to also seeking to avoid misreads, the improved conveyor belt assembly 1 collects documentation to defend against such consignor or consignee challenges. In a similar fashion, no-reads oftentimes require manual handling of the package(s), which inefficiency is generally undesirable where automated handling of packages is sought to be maximized.

Returning to FIG. 1, it may be understood therefrom that the improved conveyor belt 10 is configured primarily as conventional conveyor belts, such that it is formed and/or extended around at least two driving wheels (not shown). By turning the driving wheels, the conveyor belt 10 may be run endlessly. The conveyor belt 10 may be thus, like conventional belts of this nature, made from a multitude of materials, linkages, and so forth, so as to achieve the desired combination of durability and flexibility thereof.

Figure 3:
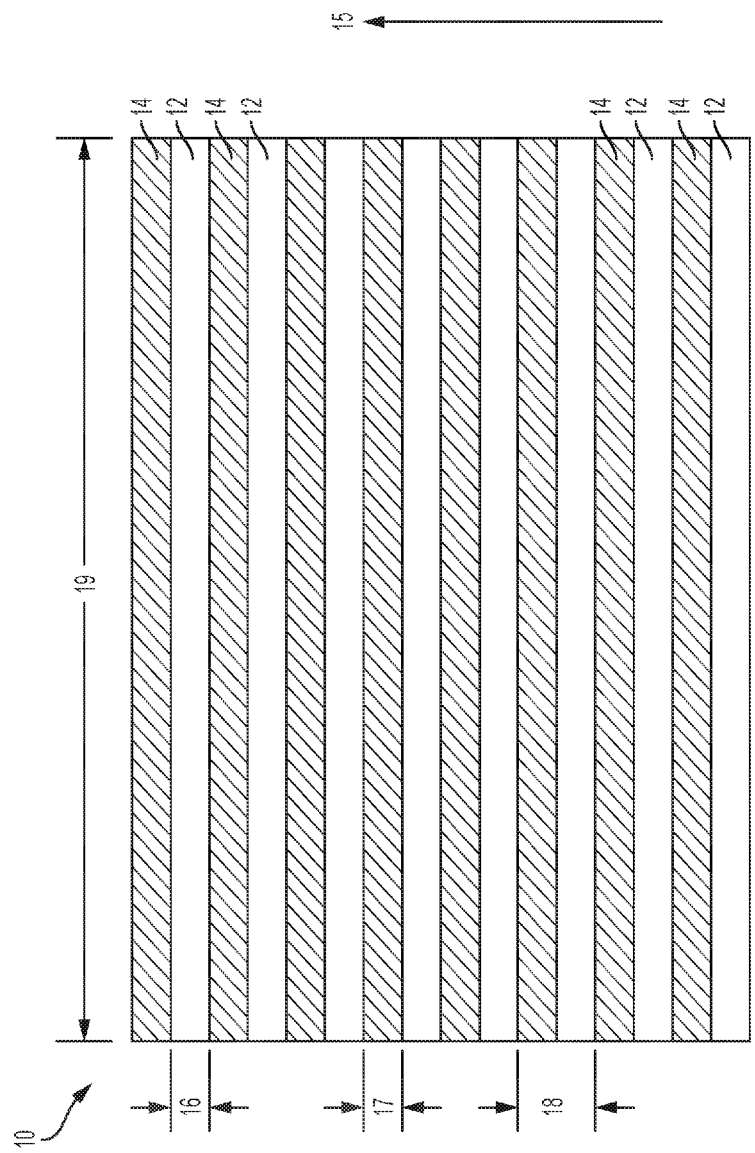
FIG. 3 is an overhead depiction of the improved conveyor belt according to various embodiments of the present invention.

As compared to conventional conveyor belts, the improved conveyor belt 10 illustrated in FIG. 1 comprises a plurality of alternating first stripes 12 and second stripes 14. With reference now to FIG. 3, according to various embodiments, relative to a machine direction 15 (i.e., a direction of travel of the conveyor belt 10 (i.e., of a primary axis thereof) as it is turned about the driving wheels in an endless fashion), the first and second stripes 12, 14 are oriented substantially perpendicular relative thereto. Stated otherwise, the first and second stripes 12, 14 define stripes transverse to the direction of travel of the improved conveyor belt 10. Of course, in other embodiments, the first and second stripes 12, 14 may be offset by some degree relative to a transverse axis/orientation relative to the machine direction 15, as may be desirable. It is not envisioned, however, that the first and second stripes 12, 14 would ever be oriented parallel to the machine direction 15 in any of these or still other embodiments.

Remaining with FIG. 3, according to various embodiments, the plurality of first and second stripes 12, 14, respectively, are provided along an entirety of the improved conveyor belt 10. In certain embodiments, however, the first and second stripe pattern—as seen for example in FIG. 3, may be provided only intermittently or in a periodic fashion along the entirety of the improved conveyor belt 10, as may be desirable. In other embodiments, the pattern of the plurality of first and second stripes 12, 14 may be otherwise provided, although it should be understood that in any of these and still other embodiments, the first and second stripes 12, 14 are provided in an alternating fashion, as illustrated in FIG. 3.

It may also be understood from FIG. 3 that the first and second stripes 12, 14, when oriented transverse to the machine direction 15 or otherwise, are configured according to various embodiments to extend substantially continuously across an entire width 19 of the conveyor belt 10. In certain embodiments, the first and second stripes 12, 14 may extend across a majority of the entire width 19 of the conveyor belt 10. In any of these and still other embodiments, the first and second stripes 12, 14 should extend so as to substantially cover all or at least substantially all of the area of the conveyor belt 10 upon which a plurality of packages may be placed thereupon. In one embodiment, the stripes 12, 14 extend across at least 80% of the width of the conveyor belt 10. In this manner, the first and second stripes 12, 14 may be utilized by the improved conveyor belt assembly 1 to, as non-limiting examples, determine whether the packages have been places sufficiently apart relative to one another and to calculate with reference to the stripes one or more dimensions of the packages, all as will be described in further detail below.

Remaining with FIG. 3, the first and second stripes 12, 14 each have known widths 16, 17, respectively. In certain embodiments, the widths of both the first and the second stripes 12, 14 are substantially the same. In other embodiments, the width of one or the other of the first and second stripes 12, 14 may be larger than the other. According to various embodiments, the widths 16, 17 of both the first and second stripes 12, 14 is approximately ten (10) centimeters. In certain embodiments, the widths 16, 17 may be greater than ten (10) centimeters or less than ten (10) centimeters, provided that in any such embodiments the widths 16, 17 are smaller than any one dimensional measurement of a package to be placed upon the conveyor belt 10, so as to ensure that the widths 16, 17 may be used to calculate therefrom the dimensions of the packages. In at least one embodiment, the widths 16, 17 are in a range of approximately 5 centimeters and 15 centimeters. In yet another embodiment, the widths 16, 17 are in a range of approximately 2 centimeters and 20 centimeters, recognizing that the lower bound of the range is controlled in these and other embodiments at least in part by the resolution capability of a camera of the imaging system 30, detailed further below.

According to various embodiments, a width 18 of a pair of the stripes 12, 14 may be known and relied upon for purposes of various calculations (e.g., of sufficient spacing and/or package dimensions, as detailed elsewhere herein), as opposed to (or in addition to) discrete widths 16, 17 of the individual stripes being known and/or relied upon. In certain embodiments, the known width 18 is approximately twenty (20) centimeters. In certain embodiments, the known width 18 may be greater than twenty (20) centimeters or less than twenty (20) centimeters, provided that in any such embodiments the known width 18 remains smaller than any one dimensional measurement of a package to be placed upon the conveyor belt 10, so as to ensure that the known width 18 may be used to calculate therefrom the dimensions of the packages. In at least one embodiment, the known width 18 is in a range of approximately 10 centimeters and 30 centimeters. In yet another embodiment, the known width 18 may be in a range of approximately 5 centimeters and 40 centimeters, recognizing that the lower bound of the range is controlled in these and other embodiments at least in part by the resolution capability of a camera of the imaging system 30, detailed further below.

According to various embodiments, with reference still to FIG. 3, the first and second stripes 12, 14 may be made of materials having contrasting colors or patterns. In certain embodiments, the first stripe 12 is light colored and the second stripe 14 is dark colored. In another embodiment, the first stripe 12 is a solid color and the second stripe 14 has a pattern (e.g., stripes, zig-zags, or the like) defined thereon. In at least one embodiment, the first stripe 12 is white and the second stripe 14 is black, although in still other embodiments any high contrast color combinations may be used for the first and second stripes 12, 14, including the non-limiting and exemplary color combinations of black and yellow, blue and white, black and orange, green and white, green and magenta, red and white, yellow and cyan, and the like. The only limitation according to various embodiments is that the contrasting colors should be configured so as to facilitate accurate measurements upon packages wrapped in a variety of materials, such as the non-limiting example of black foil, as will be described further below.

It should also be understood that according to various embodiments, the first and second stripes 12, 14 may be made of different materials and/or differently formed. For example, in certain embodiments, the second stripe 14 of dark contrasting color may be formed from a material such as that forming conventional conveyor belts, as such are well-known and understood in the art. In these and other embodiments, the first stripe 12 may be formed from a material having a high lumen factor, so as to facilitate reflectance thereof by the imaging system 30, as detailed further below. In at least one embodiment, the material of the first stripe 12 has a lumen factor of at least 0.85. In other embodiments, the lumen factor may be in a range of approximately 0.75 to 0.95. In at least one embodiment, the first stripe 12 may be formed with a luminescent paint, as a non-limiting example a luminescent paint having a lumen factor of at least 0.85.

Figure 2:
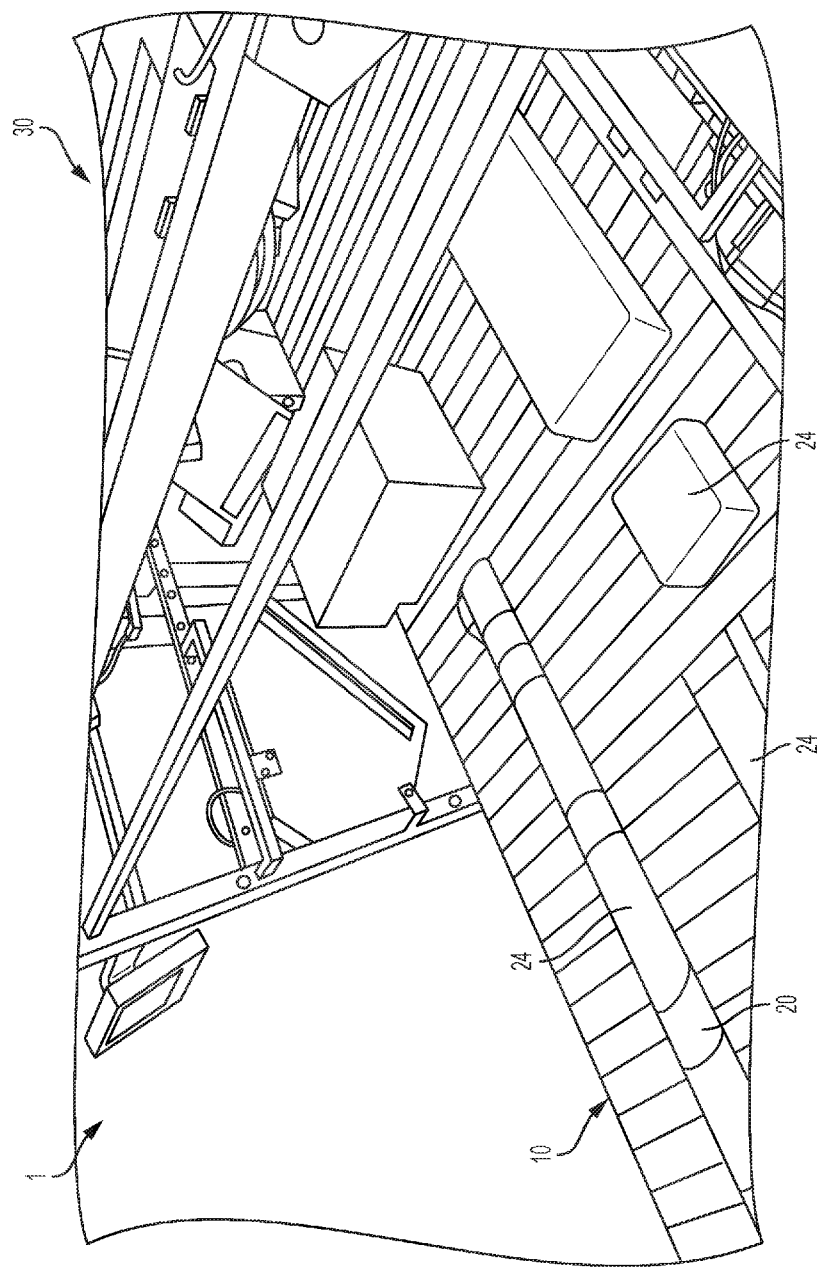
FIG. 2 is a perspective or isometric view of the improved conveyor belt assembly of FIG. 1, illustrating thereon a plurality of packages covered in package wrapping foil.

Returning now to FIG. 1 and with reference also to FIG. 2, as mentioned, a plurality of packages 20 may be placed onto the improved conveyor belt 10 described above during operation or use thereof. The plurality of packages 20 according to various embodiments may be differently sized relative to one another, as is conventional. The plurality of packages 20 may also have placed thereon one or more shipping indicia 22, including the non-limiting examples of shipping labels, package identifying parameters, carrier tracking numbers, and the like. The plurality of packages 20 may also be made of various different packaging materials 24, as also conventional. In certain embodiments, as may be understood from FIG. 2, the plurality of packages 20 may be wrapped or otherwise sealed, whether with packaging tape, foil (e.g., black foil), or the like. The contrasting colors of the first and second stripes 12, 14, as described previously herein, enables the detection (and dimensional measurement/spacing evaluation/etc.) of package characteristics with an enhanced degree of reliability and accuracy, in particular as compared to conventional conveyor belts made with a single color material, wherein use of foil 24 (or the like) is known to result in inaccuracies and non-reads of packages so configured.

Remaining with FIGS. 1 and 2, illustrated also therein is the imaging system 30 of the improved conveyor belt assembly 1. The imaging system according to various embodiments includes a plurality of cameras 32, at least one user interface or control panel 34, and a frame 35. The frame is generally configured to facilitate mounting/placement of the plurality of cameras 32 over and beside the conveyor belt 10 and to facilitate mounting of the plurality of cameras 32 in particular orientations at those locations. A plurality of mounting brackets (shown, but not numbered) may be provided as part of the frame 35 in this respect; however, it should be understood that any of a variety of frame structures and/or mounting brackets for placement of cameras 32 or other components relative to a conveyor belt 10 may be used, as such are generally known and understood in the art.

The plurality of cameras 32, which may be seen best in FIG. 1, are configured to provide substantially continuous coverage of the plurality of packages 20 positioned upon the conveyor belt 10 as the latter is endlessly moved in the machine direction 15 (see FIG. 3). In this respect, it should be understood that the plurality of cameras 32 of the imaging system 30 are provided downstream of a work-piece or package feeding location, wherein the packages 20 are fed or otherwise loaded/placed onto the conveyor belt 10. Collectively the plurality of cameras 32 according to various embodiments may thus capture images of a portion of the upper surface of the conveyor belt 10 during travel thereof, capturing further any packages 20 placed thereon.

According to various embodiments, the plurality of cameras 32 are configured to provide a continuous image feed, for example as a video sequence. In this manner, the provision of continuity ensures that no packages 20 upon the conveyor belt 10 are not imaged and/or not fully imaged, as partial or less imaging would hinder the automatic dimensional measuring thereof, as described in further detail below.

According to various embodiments, the imaging system 30 may include a user interface and/or control panel 34, which may be configured to display in real-time or near real-time to personnel operating the improved conveyor belt assembly 1 a feed of the images (or video sequence) being captured by the plurality of cameras 32. In certain embodiments, the feed displayed may be a consolidation of the multiple images or video sequences captured by each respective one of the plurality of cameras 32, while in other embodiments, only one preferred feed may be displayed via the user interface 34. The user interface or control panel 34 may be configured to provide additional functionality, as described in further detail below with reference to system 1000 and its central server 1200, which may be utilized in conjunction with the improved conveyor belt assembly 1 described herein.

First Exemplary Method of Operation 100

A first exemplary method of operation 100 of the improved conveyor assembly 1 described above will now be described with reference to FIG. 4. It should be understood that one or more of the plurality of steps illustrated therein may according to various embodiments be interchangeable and/or optional, such that, as non-limiting examples, the determination of sufficient spacing may be performed separate from a package dimension calculation and/or the generation of one or more notifications may be deferred until a later time in the process, as compared to that illustrated in the embodiment of FIG. 4. Still further, it should be understood that one or more of the plurality of steps illustrated in FIG. 4 may be computer-implemented, for example via the system 1000 and the various components thereof, as described elsewhere herein.

With reference now to step 101, therein according to various embodiments, the imaging system 30 described previously herein may be configured to capture a plurality of images as a video sequence. In order to determine therefrom data associated with each of the plurality of packages 20 on the conveyor belt 10 and captured in the video stream, a plurality of screen shots must be extracted therefrom, such that at least one screen shot is provided illustrating each of the plurality of packages 20 in their entirety. In certain embodiments, the screen shots may be captured with a periodicity of approximately one second, as the conveyor belt 10 is in operation. In other embodiments, the screen shots may be captured with any range of periodicity, such that sufficient still images are captured for each of the plurality of packages 20 in their entirety, so as to proceed to steps 102, 104 and beyond in the process of FIG. 4.

Upon extraction of the plurality of screen shots from the video sequence provided by the imaging system 30, the first exemplary method of operation 100 proceeds to step 102, wherein a determination is made as to whether sufficient spacing exists between each of the plurality of packages 20 on the conveyor belt 10. Sufficient spacing is an important consideration, at least in part, because sufficient spacing between adjacent ones of the plurality of packages 20 enables accurate and efficient dimensional readings to occur (as described below with respect to step 104). Notably, in conventional configurations, where insufficient spacing occurs, misreads and/or no-reads may occur, which labels may invoke manual package inspection procedures and/or make any subsequent dimensional measurements subject to subsequent challenge legally or otherwise.

According to certain embodiments, when performing the determination of step 102 a parameter may be established that a minimum of five (5) centimeters is desirable between discrete and adjacent packages. In other embodiments, a range of spacing between five (5) and twenty-five (25) centimeters may be acceptable. In still other embodiments, a spacing of more than ten (10) centimeters is required, for example, in those embodiments wherein the widths of the respective first and second stripes 12, 14 of the conveyor belt 10 are ten centimeters. In this respect, according to various embodiments, it may be beneficial for the spacing to correspond substantially to the width of the stripes 12, 14; although in still other embodiments, the spacing may be less than or greater than the width of one or more of the stripes 12, 14. In at least one embodiment, the stripes 12, 14 are ten centimeters wide and the minimum spacing is five centimeters between discrete adjacent ones of the plurality of packages 20.

Figure 4:
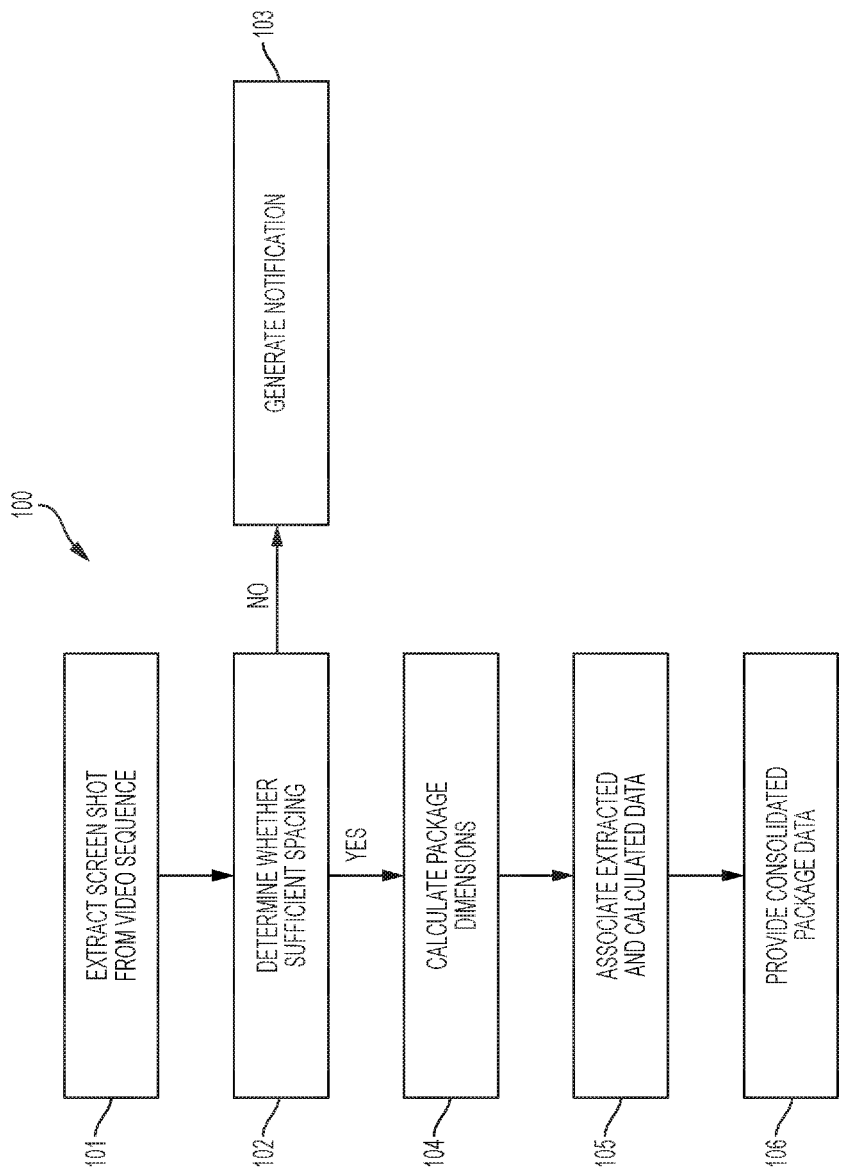
FIG. 4 is a flow chart illustrating a first exemplary method of operation of the improved conveyor belt assembly of FIGS. 1 and 2.

Remaining with step 102 of FIG. 4, the determination of whether sufficient spacing exists between each of the discrete ones of the plurality of packages 20 may according to various embodiments utilize a plurality of images compiled from several of the plurality of cameras 32 of the imaging system 30, as described previously herein. For simplicity, however, in at least one embodiment, the sufficient spacing determination may primarily utilize either top or side (i.e., non-angular) positioned cameras. Various configurations may be envisioned in this respect, however, without departing from the scope and intention of the present invention.

With continued reference to FIG. 4, if a determination is made that sufficient spacing does not exist between one or more discrete/adjacent ones of the plurality of packages 20, the first exemplary method of operation 100 proceeds to step 103, wherein one or more notifications of insufficient may be generated. The notifications may be configured in certain embodiments as one or more of audio or visual alerts to personal physically adjacent the conveyor belt assembly 1, so as to prompt an initiation of package movement so as to ensure sufficient spacing is thereafter provided. In other embodiments, the notifications may be additionally and/or alternatively transmitted via a network and/or otherwise processed via a computerized system, as described further below with reference to system 1000. In at least one embodiment, the notifications may be generated and transmitted to at least one person supervising operation of the conveyor belt assembly, which transmission may trigger not only remedial action to provide sufficient spacing (as noted), but also training for conveyor belt assembly operating personnel so as to mitigate the likelihood of insufficient spacing occurring again.

Remaining with FIG. 4, if instead step 102 determines that sufficient spacing is provided, at least with respect to a particular one of the plurality of packages 20 under examination, the first exemplary method of operation 100 is configured, according to various embodiments, to proceed to step 104. Therein, likewise based at least in part upon the extracted screen shots in step 101, one or more package dimensions are calculated. As a non-limiting example, consider an embodiment in which the plurality of cameras 32 of the imaging system 30 are placed over and around the conveyor belt 10, such that visual coverage is provided thereby at multiple angles/orientations/perspectives of the portion of the belt upon which the plurality of packages 20 travel. Based upon the captured and extracted screen shots (see step 101) of this data and further based upon the first and second stripes 12, 14—in particular the known width thereof (e.g., 10 centimeters), package dimensions may be extrapolated therefrom.

A non-limiting example is useful, with reference further to FIG. 1, wherein appearing thereon are a plurality of packages 20, including the second from the bottom left identified accordingly. The entirety of that package may be seen in this depiction, which consider hypothetically is one of the screen shots extracted in step 101 of FIG. 4. Relative to the first and second stripes 12, 14 of the conveyor belt 10 that this package crosses, it may be calculated that this package is approximately 30 centimeters in length (i.e., in the direction of travel of the belt). Applying that scale along the stripes 12, 14 it may further be extrapolated that the package is approximately 20 centimeters wide and approximately 10 centimeters tall/thick. Volumetric dimensions and the like may also be calculated, any combination of which calculated dimensions may be further utilized according to various embodiments, for example for determining shipping rates for the packages measured or the like. In other embodiments, calculations may be used additionally or alternatively for validation of shipping rates, for example, where a customer later challenges a rate imposed by the carrier for a particular package. The images and calculations performed by the conveyor belt assembly 1 and at least this first exemplary method of operation 100 thereof (along with the second method of operation 200 and so forth) may thus, in certain instances, be used to provide objective evidence of package characteristics, should legal challenges or proceedings with respect to the same arise.

Returning now with focus upon FIG. 4, upon calculation of the package dimensions in step 104, the first exemplary method of operation 100 of the improved conveyor belt assembly 1 described above is configured, according to various embodiments, to proceed in step 105 to associate the extracted and calculated data, as described above with reference to steps 101, 102, and/or 104. In certain embodiments, as a non-limiting example, the extracted screen shots containing images of the package in its entirety and the calculated package dimensions may be associated or otherwise tied relative to one another in this step. Where the improved conveyor belt assembly 1 is utilized in conjunction with the system 1000 described further below, this step 105 may involve consolidated storage of this associated data, for example, in one or more databases or the like (as such are also described further below).

In other embodiments, during step 105 the first exemplary method of operation 100 of the improved conveyor belt assembly 1 may associate note only the extracted screen shot data and the calculated dimensions with one another, but also one or more of the determination of the sufficient spacing and/or the raw video sequence data. The sufficient spacing determination being further associated may, in certain embodiments, increase the objective reliability of the associated data set, should reliance thereupon in a customer challenge become necessary. In these and still other embodiments the raw video sequence data may also be associated with the calculations derived therefrom, should retention of that additional degree of documentary evidence be desirable.

According to any of these and still other embodiments, upon completion of the at least virtual association of the data described in step 105, the first exemplary method of operation 100 of the improved conveyor belt assembly 1 is configured to proceed in step 106 to provide and/or otherwise make the associated data accessible. In certain embodiments utilizing the system 1000 described further below, the associated data may be made accessible via one or more user interfaces and/or displays. In other embodiments, the associated data or at least some portion thereof may be made available or provided to the carrier transporting the plurality of packages and/or to another entity or user, as may be desirable. It should be understood that in certain embodiments, the associated data may be provided electronically and in a near-real time fashion, while in other embodiments the associated data may only be provided upon request therefor (e.g., in the event of a customer challenge or other comparable proceeding).

Second Exemplary Method of Operation 200

Figure 5:
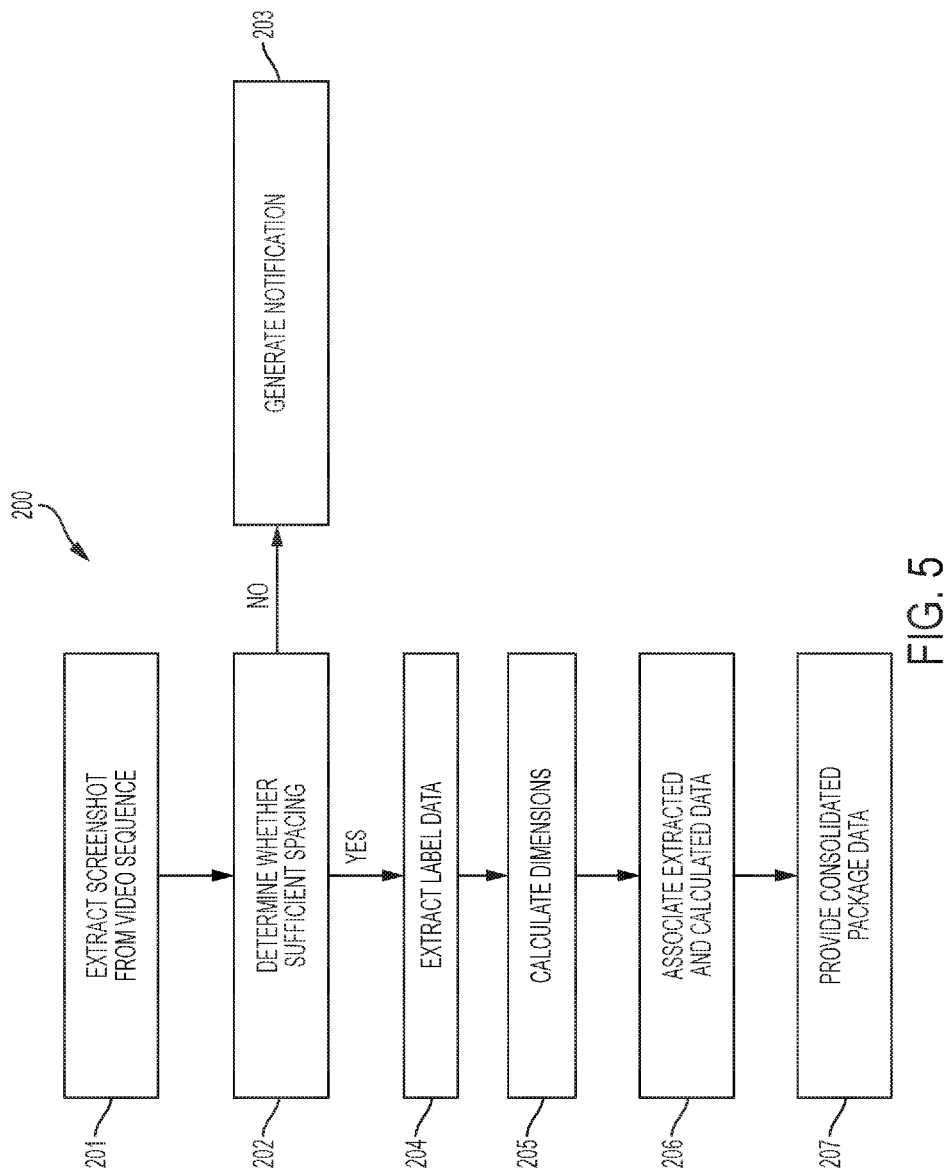
FIG. 5 is a flow chart illustrating a second exemplary method of operation of the improved conveyor belt assembly of FIGS. 1 and 2.

A second exemplary method of operation 200 of the improved conveyor assembly 1 described above will now be described with reference to FIG. 5. In comparison to the first exemplary method of operation 100 illustrated in FIG. 4, steps 201, 202, 203, 205, 206, and 207 are configured according to various embodiments in substantially the same manner as steps 101, 102, 103, 105, and 106, respectively. For example, the extraction of screen shots from a video sequence of the plurality of packages 20 (as captured via the imaging system 30 described elsewhere herein) may occur substantially the same in step 201 as in step 101, described above. The determination of sufficient spacing and the generation of notifications with respect thereto may also, in certain embodiments, occur in step 202 in substantially the same manner as in step 102. Indeed, according to various embodiments, the only difference between the first and second methods of operation 200 involves the extraction further of label data in step 204 and the association therewith further with the extracted screen shots and the calculated dimensions in step 206. In this manner, however, it should be understood that only may associated physical package characteristics be associated in step 206 and provided in step 207 (e.g., as documentary evidence), but any package labels or shipping indicia data that may be gleaned from the packages themselves may also be captured, stored, and later (or in real time or near real time fashion) provided.

With respect to step 204 of the second exemplary method of operation 200 of the improved conveyor assembly 1, it should be generally understood that the extraction of label data from exterior surfaces of packages is a generally well-known and understood process, although various novel variations thereof have been developed over time. One non-limiting example in this regard is described in U.S. Pat.

No. 8,815,031, the contents of which as are hereby incorporated by reference herein in their entirety. Once extracted, proceeding to step 206 and step 207 of the second exemplary method of operation 200—as compared to the first exemplary method of operation 100—therein according to various embodiments the extracted label data, along with the spacing, screen shot (and/or video sequence), and dimensional data may be consolidated for association and provision to one or more users/entities associated with the improved conveyor assembly 1. It should be understood that according to these and still other embodiments, the extracted label data is associated and/or provided (upon request or otherwise) in a manner intended to additionally bolster the objective evidence available to validate physical characteristics of any one of a plurality of packages having been shipped, should one or more parameters (e.g., shipping cost) associated therewith be later challenged by a customer or otherwise.

System 1000 Incorporating Improved Conveyor Belt Assembly 1

Figure 6:
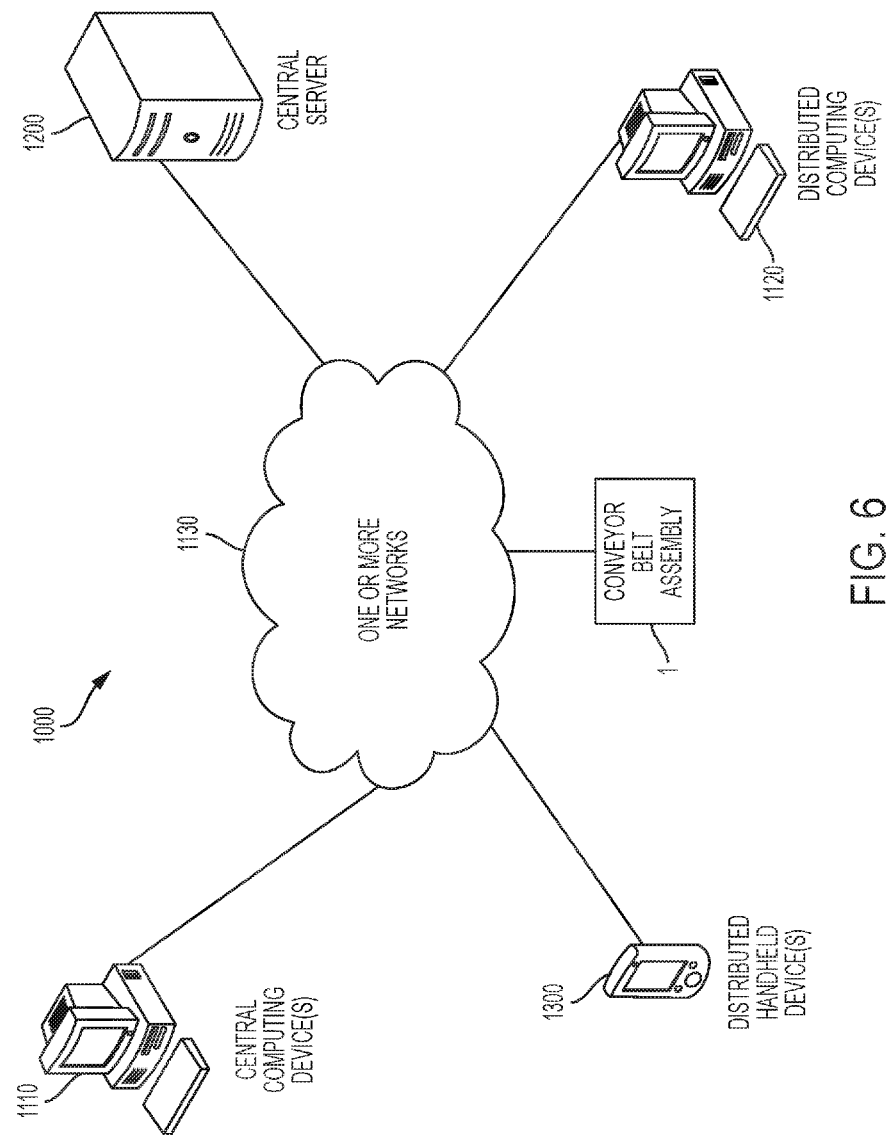
FIG. 6 is a block diagram of an exemplary improved conveyor belt system according to various embodiments.
Figure 7A:
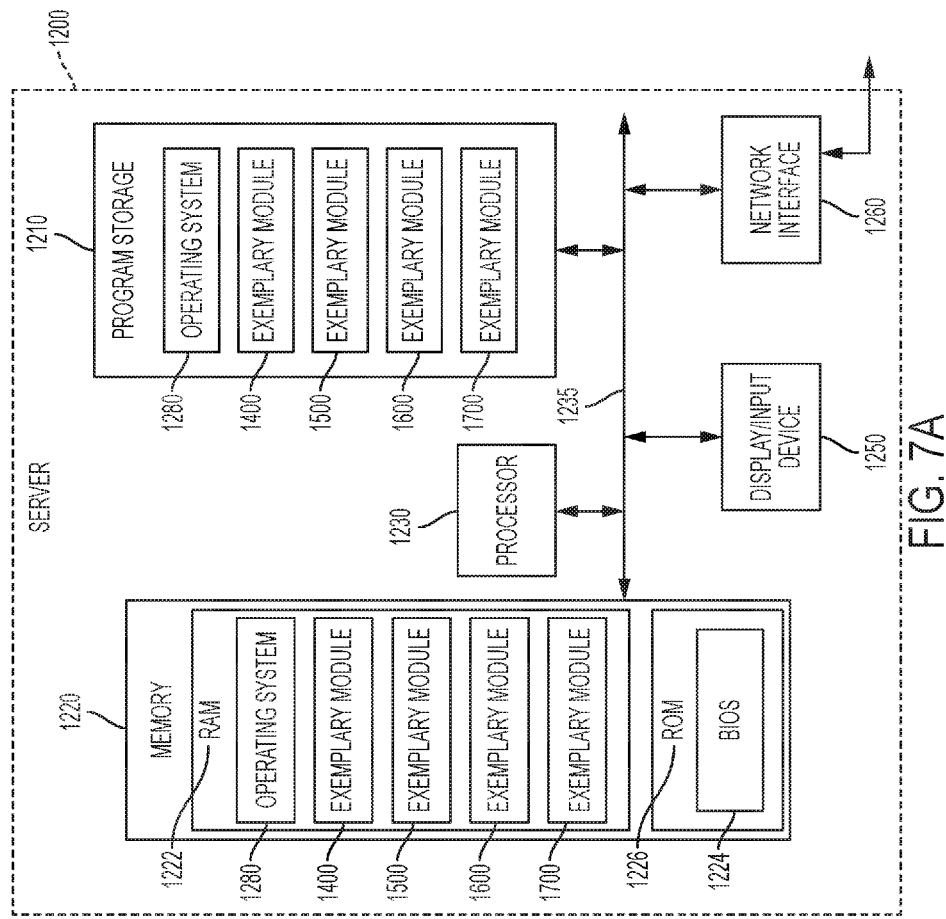
FIG. 7A is a schematic block diagram of a server associated with the system of FIG. 6 according to various embodiments.
Figure 7B:
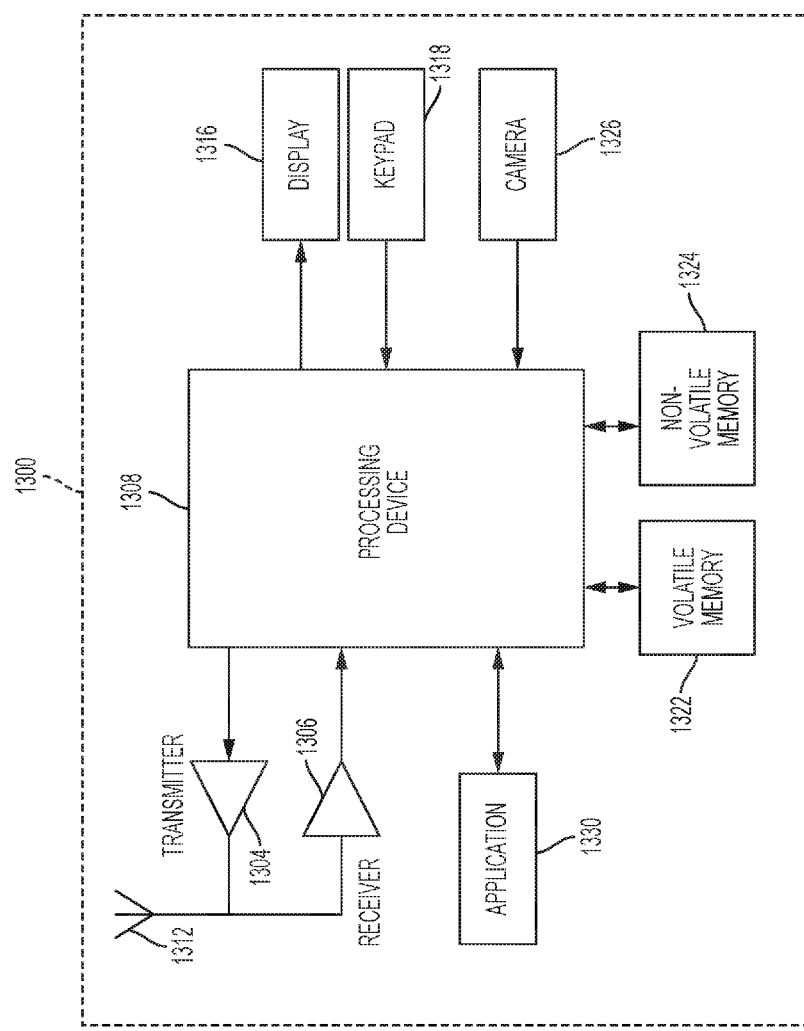
FIG. 7B is a schematic block diagram of an exemplary mobile device associated with the system of FIG. 6 according to various embodiments.

As mentioned, various embodiments of the present invention may be implemented in various ways, including in association with non-transitory computer program products used in connection with a networked system such as that illustrated in FIGS. 6-7B. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, assemblies, computing devices, computing entities, and/or the like, as have been described elsewhere herein. As such, embodiments of the present invention may take the form of an apparatus, system, assembly, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

FIG. 6 is a block diagram of an exemplary system 1000 that can be used in conjunction with various embodiments of the conveyor belt assembly 1 of the present invention, as such has been described elsewhere herein. In at least the illustrated embodiment, the system 1000 may include one or more central computing devices 1110, one or more distributed computing devices 1120, and one or more distributed handheld or mobile devices 1300, all configured in communication with the conveyor belt assembly 1 and a central server 1200 (or control unit, for example such as the user interface or control panel 34 of the conveyor belt assembly described elsewhere herein) via one or more networks 1130. While FIG. 6 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 1130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 1130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1000 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-1300 are illustrated in FIG. 8 as communicating with one another over the same network 1130, these devices may likewise communicate over multiple, separate networks.

According to one embodiment, in addition to receiving data from the server 1200, any of the improved conveyor belt assembly 1 and/or the distributed devices 1110, 1120, and/or 1300 may be further configured to collect and transmit data on their own. In various embodiments, the improved conveyor belt assembly 1 and/or devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The improved conveyor belt assembly 1 (or at least the imaging system 30 thereof) and/or devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200 (or the functionality provided thereby), in certain embodiments, may be located on the imaging system 30 of the improved conveyor belt assembly 1 and/or one or more of the distributed device(s) 1110, 1120 (at least one of which may be analogous to or comprises the user interface or control panel 34 of the imaging system 30 described elsewhere herein), and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a further mobile user interface for communication with the server 1200 and/or the improved conveyor belt assembly 1 (or at least the imaging system 30 thereof), all as will be likewise described in further detail below.

FIG. 7A is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current data captured by the improved conveyor belt assembly 1 that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. For example, the various modules 1400, 1500, 1600, 1700 may be configured to control any combination of (or all) of the steps described elsewhere herein for the first and second exemplary methods of operation 100, 200 of the improved conveyor belt assembly 1. The various modules 1400, 1500, 1600, 1700 may, at a minimum, be configured to extract screen shot data, and calculate package dimensions based therefrom. In still other embodiments, it should be understood that one or more additional and/or alternative modules may also be provided and/or otherwise configured, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1000. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on the imaging system 30 and/or on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface (see, for example the user interface 34 of the imaging system 30 of the improved conveyor belt assembly 1 described elsewhere herein) or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

FIG. 7B provides an illustrative schematic representative of a mobile device 1300 that can be used in conjunction with various embodiments of the present invention. Mobile devices 1300 can be operated by various parties, for example, as by a supervisor tasked with ensuring that a conveyor belt assembly 1 is operating and/or being operated by personnel located at the assembly appropriately. As a non-limiting example, the supervisor may be promptly notified, via the mobile device 1300 of any inaccuracies or inefficiencies, including if/when one or more packages have been placed upon the conveyor belt 10 with insufficient spacing there-between, as described elsewhere herein.

As shown in FIG. 7B, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively. The signals provided to and received from the transmitter 1304 and the receiver 1306, respectively, may include signaling data in accordance with an air interface standard of applicable wireless systems to communicate with various entities, such as the server 1200, the improved conveyor belt assembly 1 (or at least the imaging system 30 thereof), the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 1300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 308). The user input interface can comprise any of a number of devices allowing the mobile device 1300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, *), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. This could occur, for example, if a supervisor, upon being alerted of an insufficient spacing issue with respect to the convey belt assembly 1, wishes to capture additional documentation thereof via the mobile device 1300. The mobile application 1330 may further provide a feature via which various tasks may be performed with the mobile device 1300. Various configurations may be provided, as may be desirable for one or more users of the mobile device 1300 and the system 1020 as a whole.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. An improved conveyor belt assembly for facilitating improved automated handling of a plurality of packages, said improved conveyor belt assembly comprising:
  a conveyor belt comprising:
    a visible surface having a primary axis oriented in a machine direction, said visible surface being movable in said machine direction and configured, during movement, to receive thereon each of said plurality of packages;
    a plurality of first stripes having a first visible appearance, each of said plurality of first stripes at least in part defining said visible surface and being oriented perpendicular to said primary axis; and
    a plurality of second stripes having a second visible appearance, each of said plurality of second stripes at least in part defining said visible surface and being oriented perpendicular to said primary axis,
  wherein:
    the second visible appearance provides a contrasting appearance relative to the first visible appearance;
    each of said plurality of second stripes are located intermediate two of said plurality of first stripes such that the plurality of first and second stripes collectively define an alternating contrasting pattern on the visible surface of the improved conveyor belt;
    each of said plurality of first stripes has a first width defined parallel to said primary axis;
    each of said plurality of second stripes has a second width defined parallel to said primary axis, said second width being substantially the same as said first width; and
    said first and second widths are in a range between five centimeters and fifteen centimeters; and
  an imaging system comprising a plurality of cameras positioned in a plurality of locations relative to said visible surface of said conveyor belt, said imaging system being configured to provide continuous visibility of each of said plurality of packages received on said visible surface during movement thereof.

2. The improved conveyor belt assembly of claim 1, wherein:
  said first visible appearance of said plurality of first stripes is a solid pattern defined by a first color; and
  said second visible appearance of said plurality of second stripes is a striped pattern defined by a second and a third color, said second color being a contrasting color relative to said first color.

3. The improved conveyor belt assembly of claim 1, wherein said first and second widths are approximately ten centimeters.

4. The improved conveyor belt assembly of claim 1, wherein:
   each of said plurality of first stripes is made of a first material; and
   each of said plurality of second stripes is made of a second material, said second material being different than said first material, said first and second materials being connected to each other so as to define together said visible surface of said conveyor belt.

5. The improved conveyor belt assembly of claim 1, wherein:
   each of said plurality of second stripes is defined by a material of said visible surface of said conveyor belt; and
   each of said plurality of first stripes is defined by a contrasting paint applied onto said visible surface of said conveyor belt.

6. The improved conveyor belt assembly of claim 5, wherein said contrasting paint has a lumen factor of at least 0.85.

7. The improved conveyor belt assembly of claim 1, wherein:
   a first set of said plurality of cameras are positioned above and in a first plane substantially perpendicular to said visible surface; and
   a second set of said plurality of cameras are positioned beside said visible surface and in a second plane substantially perpendicular to said visible surface, said first and second planes being intersecting planes, so as to collectively provide, via the first and the second sets of said plurality of cameras, coverage of sides and tops of each of said plurality of packages placed on said visible surface and traveling on said conveyor belt.

8. The improved conveyor belt assembly of claim 1, wherein:
   said first visible appearance of said plurality of first stripes is a first color; and
   said second visible appearance of said plurality of second stripes is a second color, said second color being a contrasting color relative to said first color.

9. The improved conveyor belt assembly of claim 8, wherein said first color is white and said second color is black.

10. The improved conveyor belt assembly of claim 1, wherein:
    said visible surface of said conveyor belt has a width defined perpendicular to said primary axis; and
    each of said plurality of first and second stripes extend across at least 80% of said width.

11. The improved conveyor belt assembly of claim 10, wherein each of said plurality of first and second stripes extend across an entirety of said width.

12. A system comprising:
    a conveyor belt comprising:
       a visible surface having a primary axis oriented in a machine direction, said visible surface being movable in said machine direction and configured, during movement, to receive thereon each of said plurality of packages;
       a plurality of first stripes having a first visible appearance, each of said plurality of first stripes at least in part defining said visible surface and being oriented perpendicular to said primary axis; and
       a plurality of second stripes having a second visible appearance, each of said plurality of second stripes at least in part defining said visible surface and being oriented perpendicular to said primary axis,
    wherein:
       the second visible appearance provides a contrasting appearance relative to the first visible appearance; and
       each of said plurality of second stripes are located intermediate two of said plurality of first stripes such that the plurality of first and second stripes collectively define an alternating contrasting pattern on the visible surface of the improved conveyor belt;
    an imaging system comprising a plurality of cameras positioned in a plurality of locations relative to said visible surface of said conveyor belt;
    one or more computer processors configured for:
       during continuous operation of said improved conveyor belt, capturing, via said imaging system a continuous video sequence containing each of said plurality of packages received on said visible surface during movement thereof;
       extracting at least one screen shot containing at least one image of at least one of said plurality of packages; and
       calculating, based at least upon the first and second known widths of said plurality of first and second stripes appearing in said at least one extracted screen shot, one or more dimensions of said at least one of said plurality of packages; and
    one or more memory storage areas configured to associate and store said extracted screen shot and said calculated dimensions with said at least one of said plurality of packages.

13. The system of claim 12, wherein said system further comprises a network and said one or more computer processors are further configured for, in response to a request to access said associated and stored extracted screen shot and said calculated dimensions, transmitting said requested data over a distributed network.

14. A computer-implemented method for facilitating improved automated handling of a plurality of packages, said method comprising the steps of:
    continuously operating an improved conveyor belt, said improved conveyor belt comprising:
       a visible surface having a primary axis oriented in a machine direction, said visible surface being movable in said machine direction during said continuous operation and being configured to receive thereon each of said plurality of packages;
       a plurality of first stripes having a first known width and a first visible appearance, each of said plurality of first stripes at least in part defining said visible surface and being oriented perpendicular to said primary axis; and
       a plurality of second stripes having a second known width and a second visible appearance, each of said plurality of second stripes at least in part defining said visible surface and being oriented perpendicular to said primary axis,
    wherein:
       the second visible appearance provides a contrasting appearance relative to the first visible appearance; and
       each of said plurality of second stripes are located intermediate two of said plurality of first stripes such that the plurality of first and second stripes collectively define an alternating contrasting pattern on the visible surface of the improved conveyor belt;

during said continuous operation of said improved conveyor belt, capturing, via an imaging system a continuous video sequence containing each of said plurality of packages received on said visible surface during movement thereof;

extracting, via at least one computer processor, at least one screen shot containing at least one image of at least one of said plurality of packages;

calculating, via said at least one computer processor and based at least upon the first and second known widths of said plurality of first and second stripes appearing in said at least one extracted screen shot, one or more dimensions of said at least one of said plurality of packages; and associating and storing, in at least one memory storage area, said extracted screen shot and said calculated dimensions with said at least one of said plurality of packages.

15. The computer-implemented method of claim 14, further comprising the step of, in response to a request to access said associated and stored extracted screen shot and said calculated dimensions, transmitting said requested data over a distributed network.

16. The computer-implemented method of claim 14, wherein said method further comprises the steps of:
extracting, via said at least one computer processor and based at least in part upon said extracted at least one screen shot, package shipping indicia for said at least one of said plurality of packages; and
associating and storing, in at least one memory storage area, said extracted shipping indicia together with said extracted screen shot and said calculated dimensions for said at least one of said plurality of packages.

17. The computer-implemented method of claim 14, further comprising the steps of:
prior to calculating said one or more dimensions, determining, via said at least one computer processor and based at least upon the first and second known widths of said plurality of first and second stripes appearing in said at least one extracted screen shot, whether one or more of said plurality of packages received on said visible surface is insufficiently spaced relative to another one or more of said plurality of packages;
if determined that any of said plurality of packages are insufficiently spaced, generating at least one notification alerting at least one user of the improved conveyor belt assembly of the insufficient spacing; and
if determined that all of said plurality of packages are sufficiently spaced, associating and storing in said at least one memory storage area said determination of sufficient spacing alongside said one or more extracted screen shots and said calculated one or more dimensions for each of said plurality of packages for which sufficient spacing is determined.

18. The computer-implemented method of claim 17, wherein said method further comprises the step of, if determined that any of said plurality of packages are insufficiently spaced, ceasing continued movement of said conveyor belt until mitigation of said insufficient spacing is corrected in response to said generated notification.

19. The computer-implemented method of claim 17, wherein said determining of sufficient spacing is based upon a predetermined minimum spacing of between two and ten centimeters.

20. The computer-implemented method of claim 17, wherein said determining of sufficient spacing is based upon a predetermined minimum spacing of approximately five centimeters.

21. The computer-implemented method of claim 17, wherein said method further comprises the steps of:
extracting, via said at least one computer processor and based at least in part upon said extracted at least one screen shot, package shipping indicia for said at least one of said plurality of packages; and
associating and storing, in at least one memory storage area, said extracted shipping indicia together with said extracted screen shot, said determined sufficient spacing, and said calculated dimensions for said at least one of said plurality of packages.

22. The computer-implemented method of claim 21, wherein said step of extracting said package shipping indicia occurs prior to said step of calculating said one or more dimensions and after said step of determining whether sufficient spacing exists for each of said plurality of packages.

23. An improved conveyor belt for facilitating improved automated handling of a plurality of packages, said improved conveyor belt comprising:
a visible surface having a primary axis oriented in a machine direction;
a plurality of first stripes having a first visible appearance, each of said plurality of first stripes at least in part defining said visible surface and being oriented perpendicular to said primary axis; and
a plurality of second stripes having a second visible appearance, each of said plurality of second stripes at least in part defining said visible surface and being oriented perpendicular to said primary axis,
wherein:
the second visible appearance provides a contrasting appearance relative to the first visible appearance;
each of said plurality of second stripes are located intermediate two of said plurality of first stripes such that the plurality of first and second stripes collectively define an alternating contrasting pattern on the visible surface of the improved conveyor belt;
each of said plurality of first stripes has a first width defined parallel to said primary axis;
each of said plurality of second stripes has a second width defined parallel to said primary axis, said second width being substantially the same as said first width; and
said first and second widths are in a range between five centimeters and fifteen centimeters.

24. An improved conveyor belt assembly for facilitating improved automated handling of a plurality of packages, said improved conveyor belt assembly comprising:
a conveyor belt comprising:
a visible surface having a primary axis oriented in a machine direction, said visible surface being movable in said machine direction and configured, during movement, to receive thereon each of said plurality of packages;
a plurality of first stripes having a first visible appearance, each of said plurality of first stripes at least in part defining said visible surface and being oriented perpendicular to said primary axis; and
a plurality of second stripes having a second visible appearance, each of said plurality of second stripes at least in part defining said visible surface and being oriented perpendicular to said primary axis, wherein:
said first visible appearance of said plurality of first stripes is a solid pattern defined by a first color;
said second visible appearance of said plurality of second stripes is a striped pattern defined by a second and a third color, said second color being a contrasting color relative to said first color; and
each of said plurality of second stripes are located intermediate two of said plurality of first stripes such that the plurality of first and second stripes collectively define an alternating contrasting pattern on the visible surface of the improved conveyor belt; and
an imaging system comprising a plurality of cameras positioned in a plurality of locations relative to said visible surface of said conveyor belt, said imaging system being configured to provide continuous visibility of each of said plurality of packages received on said visible surface during movement thereof.

25. An improved conveyor belt for facilitating improved automated handling of a plurality of packages, said improved conveyor belt comprising:
a visible surface having a primary axis oriented in a machine direction;
a plurality of first stripes having a first visible appearance, each of said plurality of first stripes at least in part defining said visible surface and being oriented perpendicular to said primary axis; and
a plurality of second stripes having a second visible appearance, each of said plurality of second stripes at least in part defining said visible surface and being oriented perpendicular to said primary axis,
wherein:
said first visible appearance of said plurality of first stripes is a solid pattern defined by a first color;
said second visible appearance of said plurality of second stripes is a striped pattern defined by a second and a third color, said second color being a contrasting color relative to said first color; and
each of said plurality of second stripes are located intermediate two of said plurality of first stripes such that the plurality of first and second stripes collectively define an alternating contrasting pattern on the visible surface of the improved conveyor belt.

* * * * *